United States Patent
Johnson et al.

(10) Patent No.: US 8,157,132 B1
(45) Date of Patent: Apr. 17, 2012

(54) FUEL AND OIL MIXING DEVICE

(76) Inventors: R. Scott Johnson, Lawrenceburg, KY (US); Benjamin Lee Kessinger, III, Lexington, KY (US); Thomas M. McCullough, Lexington, KY (US); Kenneth M. Nielsen, Lexington, KY (US)

( * ) Notice: Subject to any disclaimer, the term of this patent is extended or adjusted under 35 U.S.C. 154(b) by 932 days.

(21) Appl. No.: 12/110,583

(22) Filed: Apr. 28, 2008

Related U.S. Application Data

(60) Provisional application No. 60/914,345, filed on Apr. 27, 2007.

(51) Int. Cl.
G05D 11/02 (2006.01)

(52) U.S. Cl. .................. 222/144.5; 222/129; 222/145.5; 137/114; 137/396

(58) Field of Classification Search ............... 222/144.5, 222/145.5, 145.7, 145.8, 164, 129; 137/114, 137/896
See application file for complete search history.

(56) References Cited

U.S. PATENT DOCUMENTS

| | | | |
|---|---|---|---|
| 4,069,835 A | 1/1978 | Stadler | |
| 4,121,631 A | 10/1978 | Jones | |
| 4,262,710 A | 4/1981 | Nomura et al. | |
| 4,266,693 A * | 5/1981 | Pfeiffer | 222/135 |
| 4,286,632 A | 9/1981 | Abel | |
| 4,294,372 A * | 10/1981 | Onishi | 220/501 |
| 4,381,741 A | 5/1983 | Walsworth | |
| 4,383,504 A | 5/1983 | Walsworth | |
| 4,594,971 A | 6/1986 | Borst | |
| 4,819,833 A * | 4/1989 | Huddleston et al. | 222/155 |
| 4,846,373 A * | 7/1989 | Penn et al. | 222/137 |
| 4,955,943 A | 9/1990 | Hensel et al. | |
| 5,108,016 A * | 4/1992 | Waring | 222/468 |
| 5,295,610 A * | 3/1994 | Levison | 222/26 |
| 5,402,913 A | 4/1995 | Graf | |
| 5,628,295 A | 5/1997 | Todero et al. | |
| 5,632,241 A | 5/1997 | Binversie et al. | |
| 6,250,154 B1 * | 6/2001 | Cheresko | 73/426 |
| 6,655,335 B2 | 12/2003 | Imafuku et al. | |
| 7,481,335 B2 | 1/2009 | Owens | |
| 7,487,889 B2 * | 2/2009 | Owens | 222/144.5 |
| 2005/0028436 A1 | 2/2005 | Gantzer | |

FOREIGN PATENT DOCUMENTS

| | | |
|---|---|---|
| EP | 0590041 | 5/2007 |
| WO | 8204464 | 12/1982 |

* cited by examiner

*Primary Examiner* — Kevin P Shaver
*Assistant Examiner* — Donnell Long
(74) *Attorney, Agent, or Firm* — King & Schickli, PLLC

(57) ABSTRACT

A fuel and oil mixing device secured to and used with a fuel container storing a quantity of fuel includes an oil reservoir, a mixer body, an oil metering valve, and an adjustment knob. The oil reservoir stores oil, defines an orifice for oil to exit, and defines an orifice for fuel to pass through. The mixer body is secured to and in fluid communication with the oil reservoir for receiving oil and fuel. The oil metering valve is housed within the mixer body and defines a plurality of slots on an exterior surface thereof, each such slot controlling flow of oil into the mixer body. The adjustment knob is operably connected to the oil metering valve, such that manipulation of the adjustment knob effectively selects one of the slots, such that a mixture with a desired fuel-oil ratio can be dispensed.

18 Claims, 11 Drawing Sheets

US 8,157,132 B1

FUEL AND OIL MIXING DEVICE

CROSS-REFERENCE TO RELATED APPLICATIONS

The present application claims priority to U.S. Provisional Patent Application Ser. No. 60/914,345 filed on Apr. 27, 2007, the entire disclosure of which is incorporated herein by reference.

BACKGROUND OF THE INVENTION

Two-stroke engines are generally lighter, simpler, and less expensive than four-stroke or diesel engines. Therefore, many devices utilize two-stroke engines. For example, radio-controlled toys, small outboard boat motors, jet skis, off-road motorcycles, and lawn and garden equipment (e.g., lawn mowers, chain saws, leaf blowers, and weed trimmers) will typically utilize two-stroke engines. Although the above-mentioned advantages led to the widespread use of two-stroke engines, these engines possess disadvantages as well. For instance, in a four-stroke engine, the crankcase is completely separate from the combustion chamber, so the crankcase can be filled with oil to lubricate the engine. On the other hand, a two-stroke engine includes no separate oil chamber. Thus, to lubricate a two-stroke engine, oil must be mixed with a fuel, such as gasoline, that is introduced into a fuel-oil tank of the engine. Without the proper amount of oil in the fuel-oil mixture, a two-stroke engine will quickly seize and malfunction. Consequently, great care must be taken to ensure that the proper ratio of fuel to oil is in the mixture that is introduced into the engine.

In most cases, fuel and oil are maintained in separate containers, and then manually metered into and mixed in a third container. Besides using multiple containers, the mixing process can also be messy and difficult to get a proper ratio of fuel to oil. Such difficulty in mixing the fuel and oil for a two-stroke engine is exacerbated by the fact that many people own more than one device that employs a two-stroke engine. Since each two-stroke engine generally requires its own particular fuel-oil ratio, owners of more than one device using a two-stroke engine must repeat the aforementioned mixing process for each device.

Furthermore, it has been recently discovered that volatile vapors escaping to the atmosphere from a container as the fuel-oil mixture is poured into a tank pose a health, safety, and environmental hazard. Accordingly, containers are now being constructed with various types of pour spouts having an internal vent which allow for venting of vapor between the container and the tank into which fuel is flowing. The internal venting container permits for air displacement between the container and the fuel-oil tank to allow a continuous and smooth flow of the fuel-oil mixture without venting any vapor into the atmosphere.

In co-pending and commonly assigned U.S. patent application Ser. No. 11/753,811, which is incorporated herein by reference, a fuel and oil mixing device is described that holds a quantity of fuel and oil and allows a user to readily select the ratio of fuel to oil in the mixture that exits the device, thus allowing a single device to be used to fill multiple two-stroke engines. The fuel and oil mixing device includes a mixing chamber defining an internal volume, a fuel intake opening, an oil intake opening, and an outlet. Fuel is delivered into the mixing chamber from the fuel reservoir through the fuel intake opening, while oil is delivered into the mixing chamber through the oil intake opening. An oil control valve controls oil flowing into the mixing chamber through the oil intake opening so as to allow the user to dispense a fuel-oil mixture through the outlet of the mixing chamber with a predetermined fuel-to-oil ratio.

Such a construction, however, is not readily adaptable to existing fuel containers. Thus, there remains a need in the art for a fuel and oil mixing device that allows a user to accurately and quickly mix the proper amounts of fuel and oil for multiple devices employing a two-stroke engine, preferably a device that can be used with common fuel containers currently in use.

SUMMARY OF THE INVENTION

The present invention is a fuel and oil mixing device that holds a quantity of oil and can be used with a common fuel container, allowing a user to readily adjust the fuel-oil ratio in the mixture that exits the container, such that a single container can be used to fill two-stroke engines requiring different fuel-oil ratios.

An exemplary fuel and oil mixing device made in accordance with the present invention includes an oil reservoir for storing a quantity of oil; a mixer body adjacent the oil reservoir; an oil metering valve housed within the mixer body; an adjustment knob for manipulating the oil metering valve; and an inner housing within the mixer body.

The oil reservoir is a generally cylindrical member that is designed to be inserted into the fuel container. The oil reservoir defines a fuel metering orifice for fuel housed in the container to pass through the oil reservoir, an internal venting orifice acting as part of a "pass through" venting system, and an orifice for the oil to exit.

The mixer body includes a collar to secure the mixer body to the fuel container and further acts as a lid over the oil reservoir. The mixer body includes a baffle that acts as a dam for oil from the oil reservoir with an oil exit orifice near the center of the baffle. The mixer body also defines an integral ramp after the oil exit orifice. During use, oil enters the exit orifice and passes along the oil metering valve, where it exits onto the ramp. The ramp terminates right above the fuel metering orifice of the oil reservoir, such that the oil is introduced into the fuel flowing from the fuel container.

The oil metering valve is a cylindrical component housed in a cavity defined by the mixer body. The oil metering valve controls oil flow from the oil reservoir through the oil exit orifice and to the ramp. Specifically, the oil metering valve defines a plurality of longitudinal slots on an exterior surface thereof, each such slot controlling flow of the oil from said oil reservoir through said mixer body, and each such slot representing a predetermined fuel-oil ratio.

An adjustment knob is secured to and works in conjunction with the oil metering valve to allow a user to manipulate the oil metering valve to select the fuel-oil ratio in the mixture that exits the container. Specifically, the adjustment knob and the oil metering valve rotate together as the portion of the adjustment knob accessible to a user from the exterior of the mixer body is manipulated. By rotating the adjustment knob in this manner, one of the slots defined by the oil metering valve is effectively selected for controlling oil flow from the oil reservoir to the ramp.

The inner housing is positioned within and connected to the mixer body, and has a spout portion which facilitates mixing of the fuel and oil. The fuel and oil leave the spout portion as a mixture and empty into an outer mixing cavity defined by the mixer body.

To use the exemplary fuel and oil mixing device, a user places a quantity of fuel in the fuel container, places a quantity of oil in the oil reservoir, and connects the fuel and oil mixing device to the fuel container. The user then manipulates the adjustment knob to the desired fuel-oil ratio, such that one of the slots defined by the oil metering valve is effectively selected for controlling oil flow from the oil reservoir. Then, as the fuel container fitted with the fuel and oil mixing device is tipped forward, oil flows from the oil reservoir, out of the oil exit orifice, along one of the slots selected by the user, and exits on the ramp. At the same time, fuel flows from the fuel container, passes through the fuel metering orifice, passes through the mixer body orifice, and then mixes with the oil exiting the ramp. The integral spout portion defined by the inner housing facilitates mixing of the streams of fuel and oil, funneling the fuel-oil mixture into an outer mixing cavity defined between the inner housing and the exterior wall of the mixer body. From this outer mixing cavity, the fuel-oil mixture having the desired fuel-oil ratio is dispensed through the spout.

DETAILED DESCRIPTION OF THE INVENTION

The present invention is a fuel and oil mixing device that holds a quantity of oil and can be used with a common fuel container, allowing a user to readily adjust the fuel-oil ratio in the mixture that exits the container, such that a single container can be used to fill two-stroke engines requiring different fuel-oil ratios.

Figure 1:
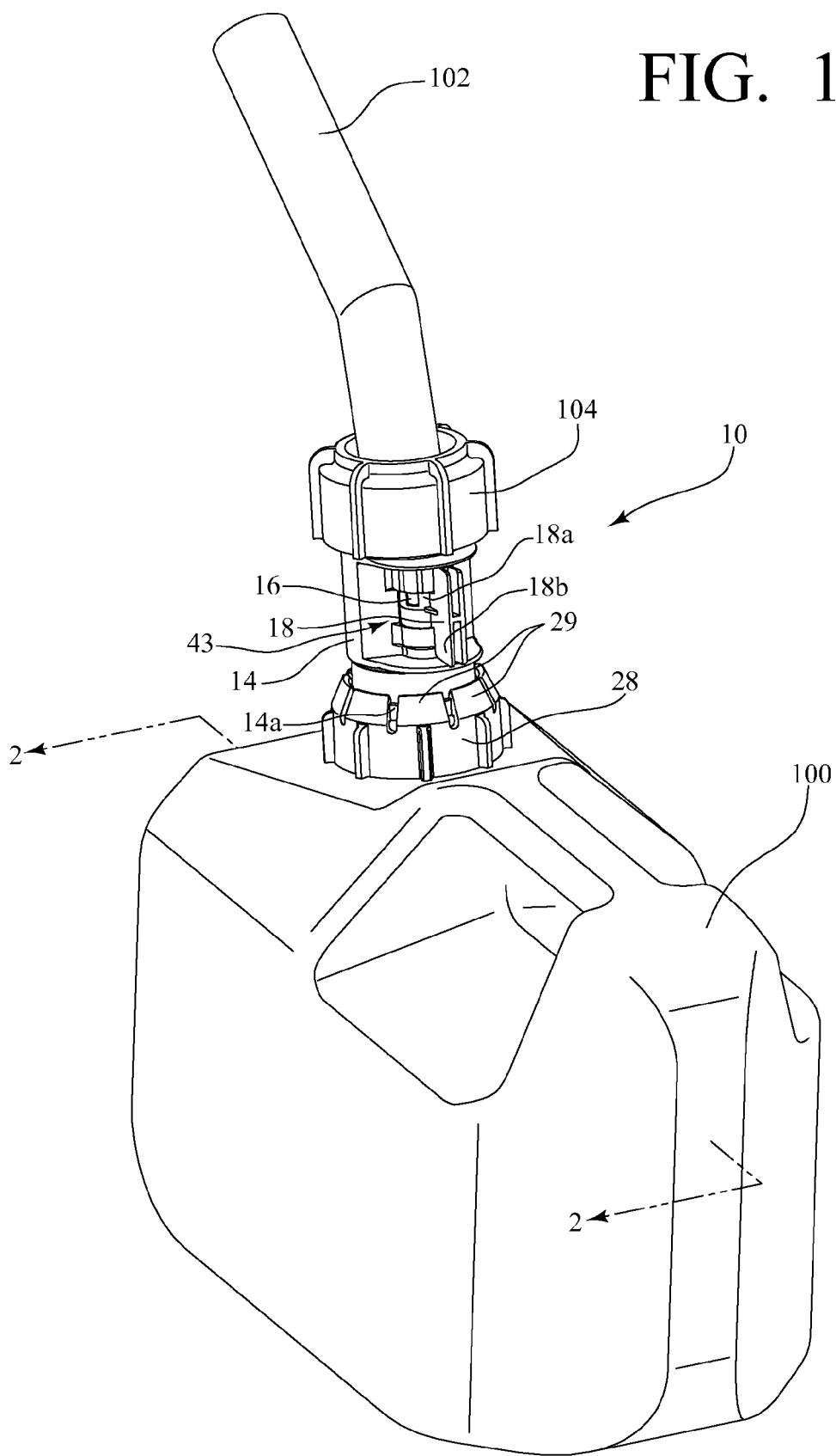
FIG. 1 is a perspective view of an exemplary fuel and oil mixing device made in accordance with the present invention being used with a common fuel container.
Figure 2:
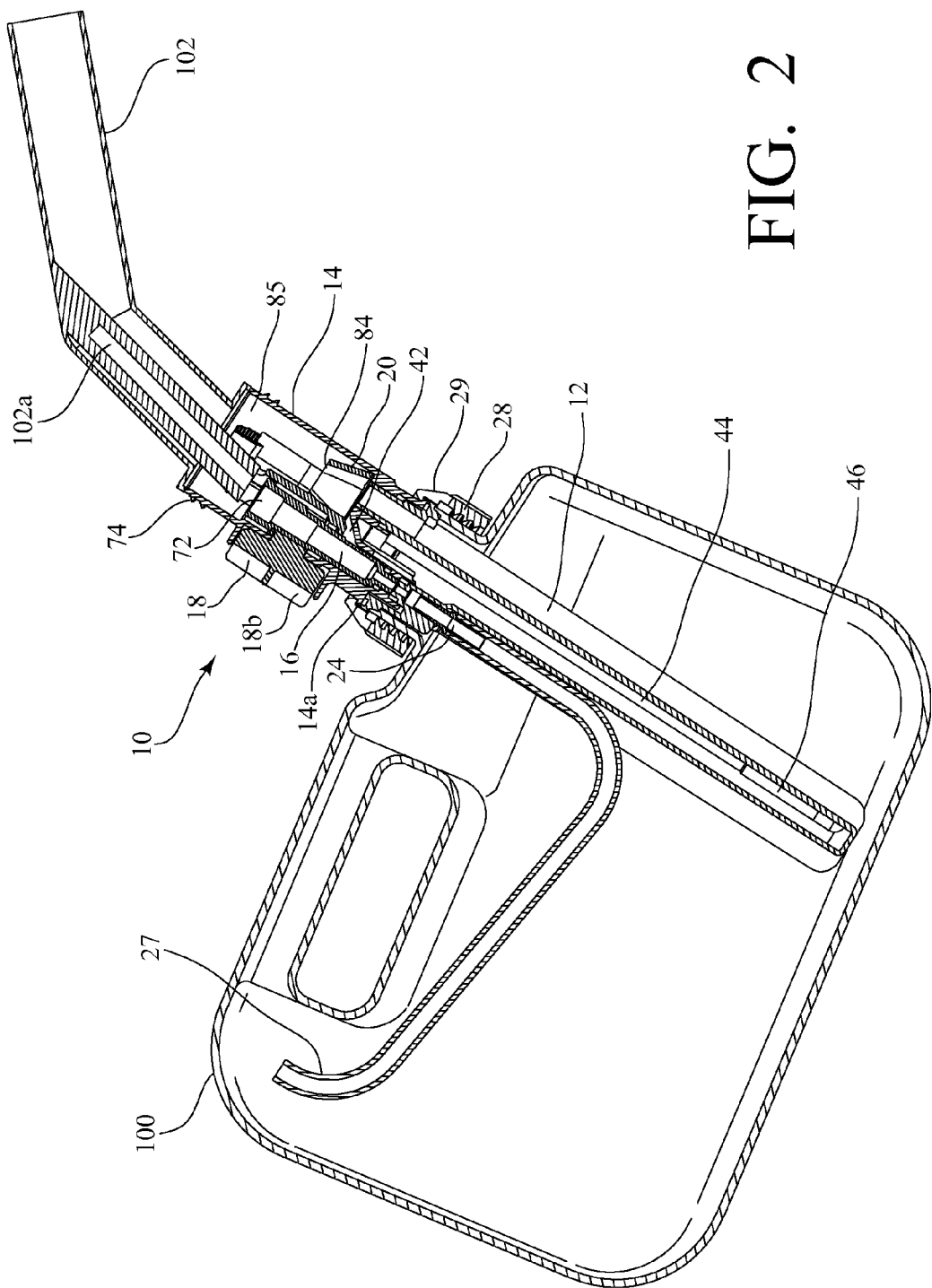
FIG. 2 is a cross-sectional view of the exemplary fuel and oil mixing device of FIG. 1, taken along line 2-2 of FIG. 1.
Figure 3:
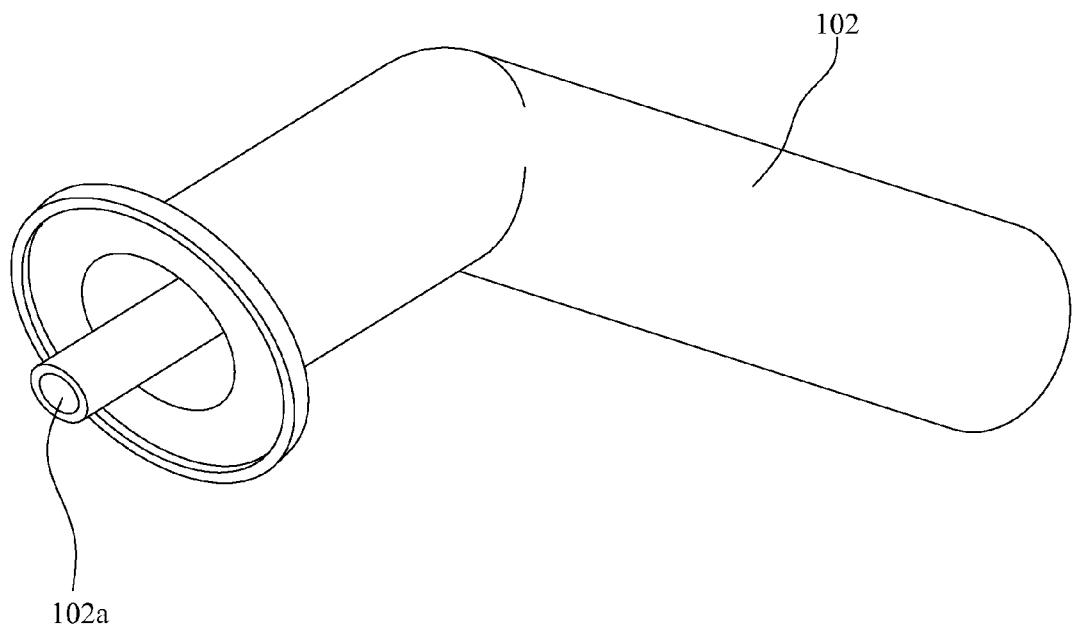
FIG. 3 is a perspective view of the spout of the fuel container of FIGS. 1 and 2, which includes an internal vent.

Referring initially to FIGS. 1-3, a common fuel container 100 has been fitted with an exemplary fuel and oil mixing device 10 made in accordance with the present invention. The common fuel container 100 typically includes a spout 102 having an internal vent 102a and secured to the fuel container 100 by a spout collar 104. In this case, the fuel and oil mixing device 10 is interposed between the spout collar 104 and the fuel container 100, as is further described below.

The exemplary fuel and oil mixing device 10 includes an oil reservoir 12 for storing a quantity of oil; a mixer body 14 adjacent the oil reservoir 12; an oil metering valve 16 housed within the mixer body 14; an adjustment knob 18 for manipulating the oil metering valve 16; and an inner housing 20 within the mixer body 14. The relationships between and functions of these various components are described in detail below.

Figure 4A:
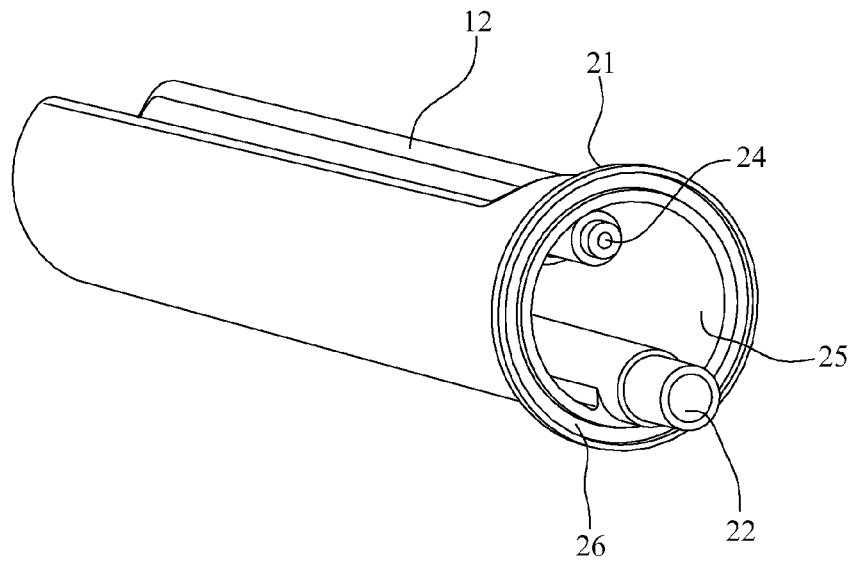
FIG. 4A is a perspective view of the oil reservoir of the exemplary fuel and oil mixing device of FIGS. 1 and 2.
Figure 4B:
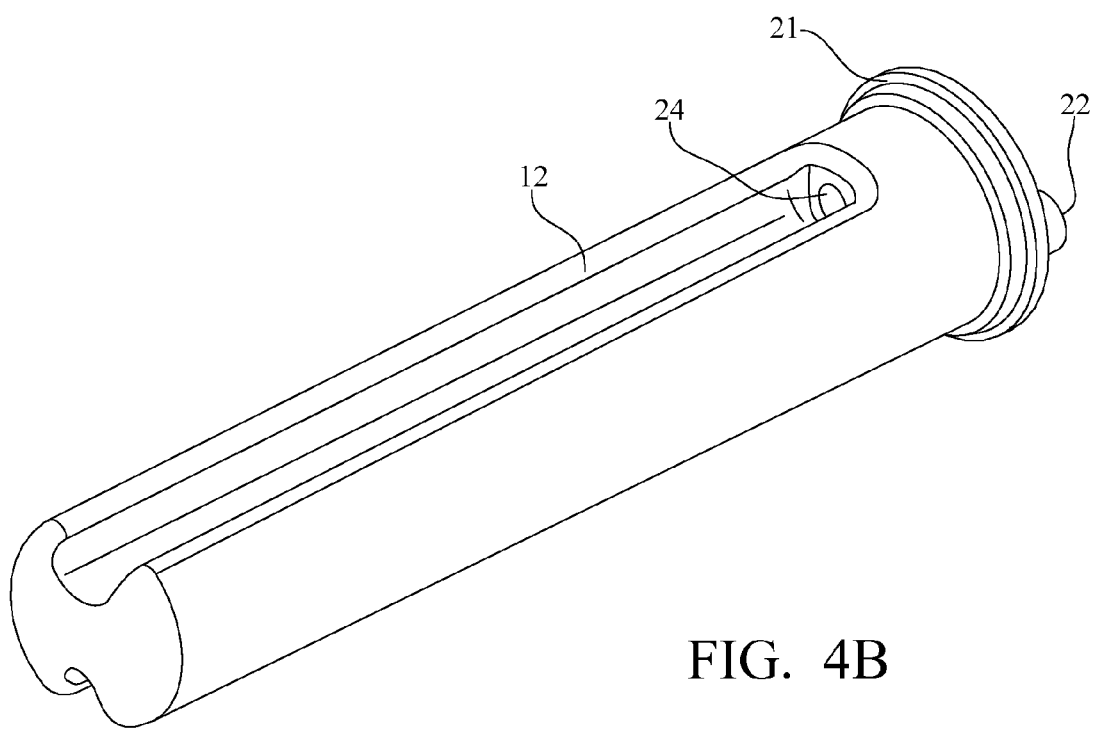
FIG. 4B is a perspective view of the oil reservoir of the exemplary fuel and oil mixing device of FIGS. 1 and 2.

Referring now to FIGS. 4A and 4B, the oil reservoir 12 is a generally cylindrical member that is designed to be inserted into the fuel container 100 and has a circumferential flange 21 for engaging the opening of the fuel container 100. The oil reservoir 12 defines a fuel metering orifice 22 for fuel housed in the fuel container 100 to pass through the oil reservoir 12, an internal venting orifice 24 acting as part of a "pass through" venting system, and an orifice 25 for the oil to exit (and for allowing a quantity of oil to be added to the oil reservoir 12). The fuel metering orifice 22 may be provided with an associated o-ring groove or backing lip (not shown in FIGS. 4A and 4B) for receiving an o-ring to act as a seal. The oil reservoir 12 also has a front face 26 that may be provided with an o-ring groove (not shown in FIGS. 4A and 4B) for abutting a matching o-ring groove (not shown in FIGS. 4A and 4B) of the mixer body 14, such that the grooves can collectively receive an o-ring to create an improved seal between the components.

In this exemplary embodiment and as best shown in FIG. 2, a generally U-shaped plastic tube 27 is connected to and in fluid communication with the internal venting orifice 24 of the oil reservoir 12. Since vent-less fuel containers requires the fuel to leave the apparatus at a single location, fuel cannot be allowed to exit through the vent. As a result, the plastic tube 27 extends into the cavity of the fuel container 100 and is positioned above the level of the fuel in the fuel container 100. As the fuel container 100 is tipped forward for pouring, the plastic tube 27 remains above the fuel level, preventing fuel from leaving the vent, yet allowing air to enter, as is further described below.

Figure 5:
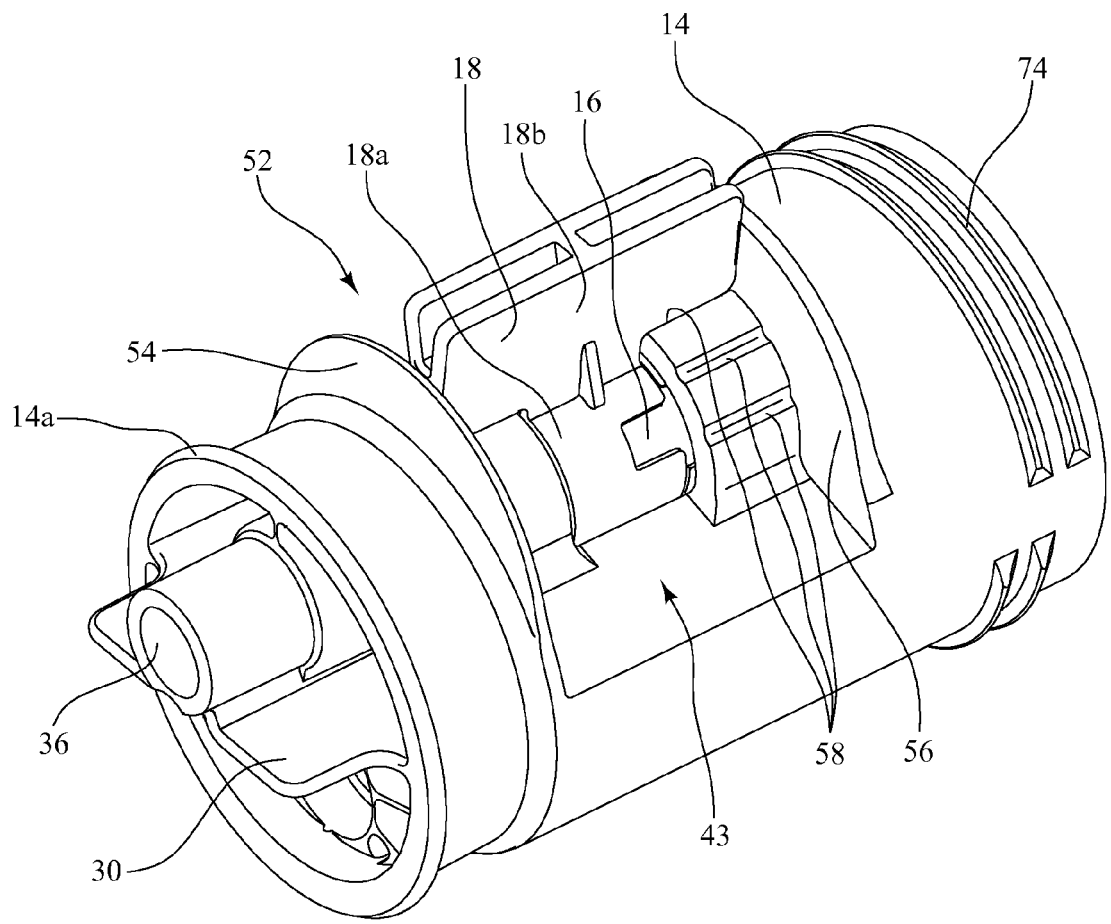
FIG. 5 is a perspective view of the mixer body of the exemplary fuel and oil mixing device of FIGS. 1 and 2.
Figure 6:
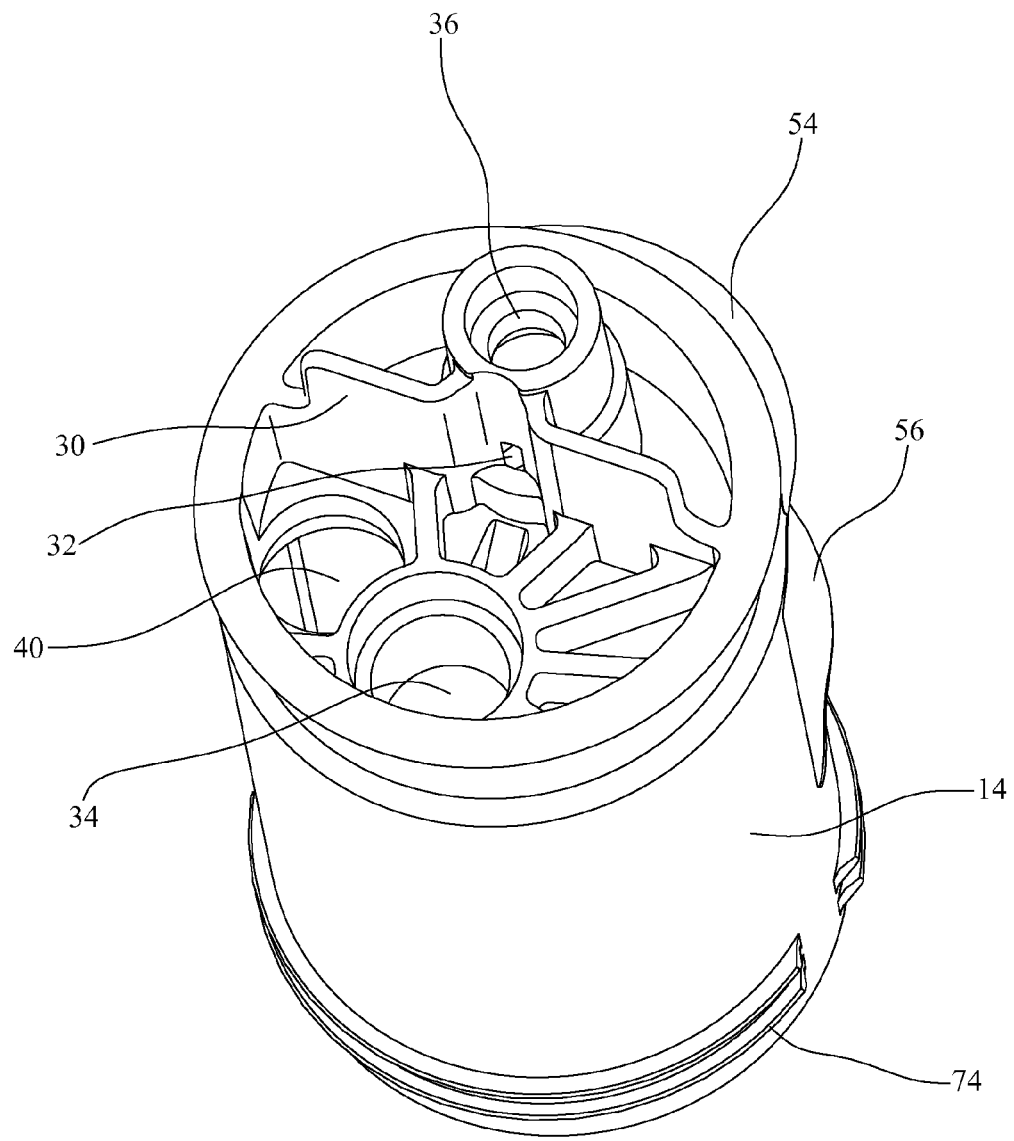
FIG. 6 is an alternate perspective view of the mixer body of FIG. 5, showing the end of the mixer body that mates with the oil reservoir.

Referring now to FIGS. 5-10, the mixer body 14 acts as a lid over the oil reservoir 12. As best shown in FIGS. 5 and 6, the mixer body 14 includes a baffle 30 that acts as a dam for oil from the oil reservoir 12. When the fuel container 100 is tilted from a level position to a pouring position, oil flows from the oil reservoir 12 and pools behind the baffle 30. An oil exit orifice 32 defined by the mixer body 14 near the center of the baffle 30 serves as the only pathway for oil to exit through the mixer body 14, actually directing the oil into the oil metering valve 16, as is further described below. The mixer body 14 further defines an orifice 34 for fuel from the fuel metering orifice 22 of the oil reservoir 12 to pass through the mixer body 14. The mixer body 14 further defines a cavity 36, which receives and positions the oil metering valve 16. Finally, the mixer body 14 defines another orifice 40, which allows for placement of a dip stick 44 (best shown in FIGS. 2, 10, 11, and 12) and for adding oil to the oil reservoir 12 without disengaging the fuel and oil mixing device 10 from the fuel container 100, as is further described below Referring now to FIG. 7, the mixer body 14 defines an integral ramp 42 located beyond the oil exit orifice 32. After the oil passes through the oil exit orifice 32 and along a pathway defined by the oil metering valve 16 (as is further described below), it exits onto the ramp 42. The ramp 42 terminates right above the orifice 34 for fuel that is passing from the fuel metering orifice 22 of the oil reservoir 12 into the mixer body 14, where it introduces oil to the fuel flowing from the fuel container 100 during use. This ramp 42 also allows residual oil to flow back into the oil reservoir 12 after use, i.e., when the fuel container 100 is returned to a level position. Although some fuel-oil mixture could also enter the oil reservoir 12 or the fuel container 100, any dilution of the oil or fuel would be minimal and would not affect the fuel-oil ratio during subsequent use in any meaningful way.

Referring again to FIG. 5, the mixer body 14 also defines an opening 43 through its exterior surface which allows the adjustment knob 18 to be secured to the oil metering valve 16, which is received in the cavity 36 defined by the mixer body 14. At the same time, a portion of the adjustment knob 18 extends away from the mixer body 14 so that it is accessible to a user. Specifically, in this exemplary embodiment, the adjustment knob 18 includes a portion 18a adapted to be secured to the oil metering valve 16 (as is further described below) and a portion 18b that is adapted to be grasped and manipulated by a user. Accordingly, the portion 18b that is adapted to be grasped and manipulated is positioned in a cavity 52 bounded by two ribs 54, 56 on the exterior surface of the mixer body 14, and as such, is readily accessible to the user. Furthermore, in this exemplary embodiment, in order to positively locate and fix the position of the adjustment knob 18 relative to the mixer body 14, the mixer body may include integral grooves 58 that engage the portion 18b of the adjustment knob 18 that is adapted to be grasped and manipulated by a user. In this exemplary embodiment, the portion 18b of the adjustment knob 18 that is adapted to be grasped and manipulated by a user includes a small, integral projection 82 (best shown in FIG. 15) with a shape generally corresponding to the geometry of the respective grooves 58 to facilitate such an engagement and to positively locate and fix the position of the adjustment knob 18 relative to the mixer body 14. Thus, the position of the adjustment knob 18 will remain fixed until sufficient force is applied to disengage the adjustment knob 18 from one of the grooves 58.

Figure 12:
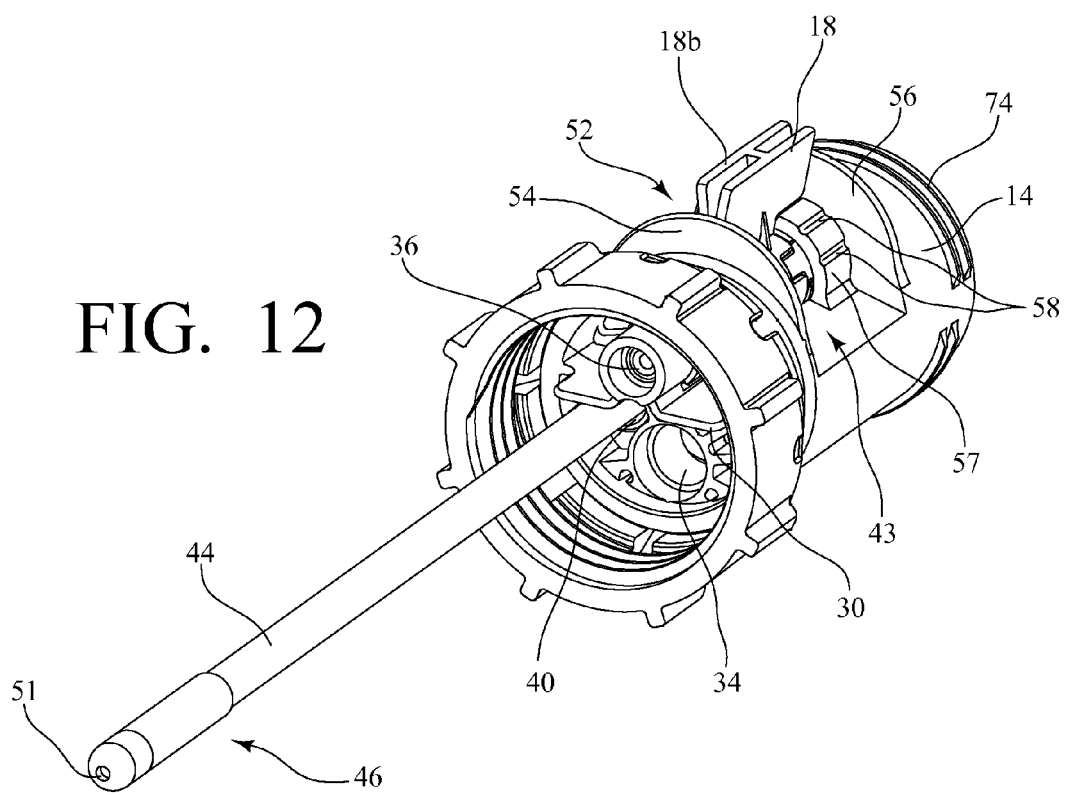
FIG. 12 is an alternate perspective view of the mixer body of FIG. 10, including the dip stick.

Finally, the mixer body 14 includes a mixer body collar 28, as shown in FIGS. 1-2 and 12, which is similar in construction and function to the spout collar 104. The mixer body collar 28 has internal threads for mating with threads found on the fuel container 100, as shown in FIG. 2. In this exemplary embodiment, the mixer body collar 28 further includes a plurality of fingers 29, each of which are adapted to engage a lower lip 14a of the mixer body 14. As such, the mixer body collar 28 is secured to, but not rigidly fixed to the mixer body 14 when the mixer body collar 28 is disengaged from the fuel container 100. Then, to connect the fuel and oil mixing device 10 to the container, the internal threads defined by of the mixer body collar 28 are mated with the threads found on the fuel container 100, and by rotating the mixer body collar 28 relative to the fuel container 100, the fuel and oil mixing device 10 is securely connected to the fuel container 100.

Similarly, in this exemplary embodiment, the mixer body 14 also includes integral threads 74, as best shown in FIG. 2, which are preferably molded into the distal end of the mixer body 14 for securing the spout 102 to the mixer body 14 using the spout collar 104. In other words, rather than being secured to the fuel container 100 itself, the spout 102 is secured to the mixer body using the existing spout collar 104.

Figure 13:
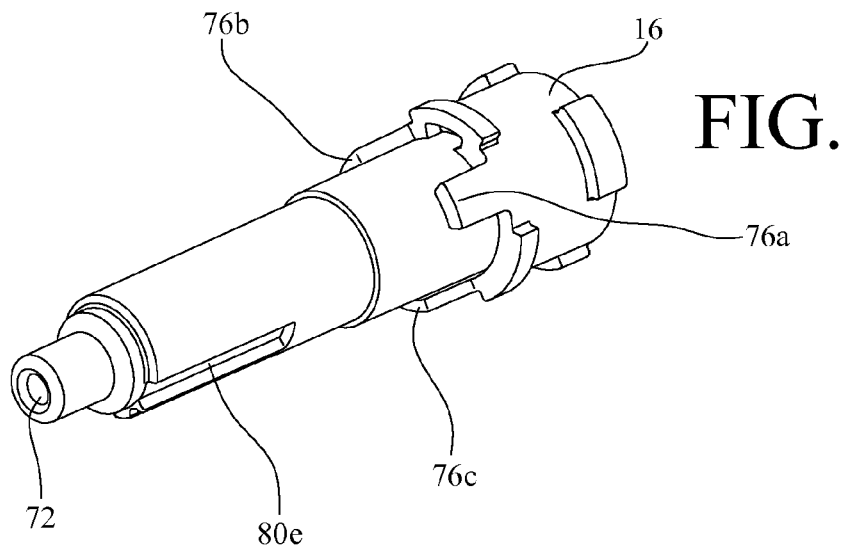
FIG. 13 is a perspective view of the oil metering valve of the exemplary fuel and oil mixing device of FIGS. 1 and 2.
Figure 14:
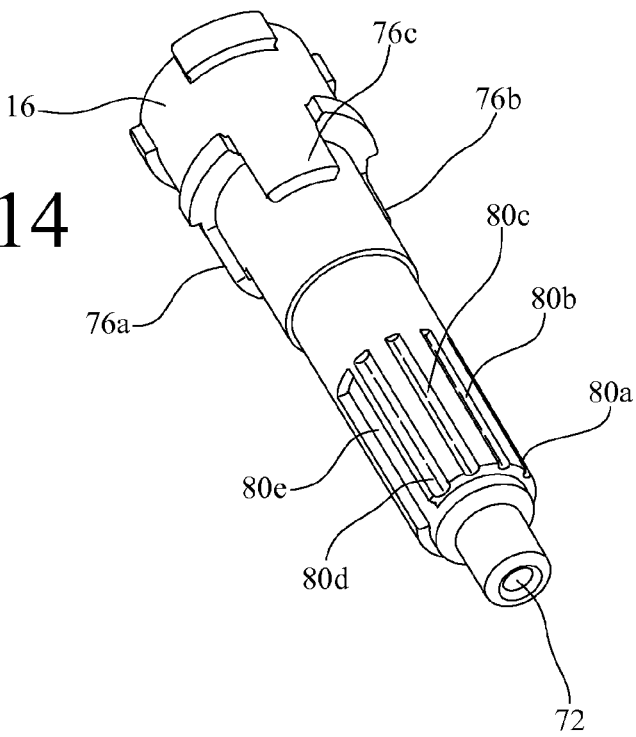
FIG. 14 is an alternate perspective view of the oil metering valve of FIG. 13.
Figure 15:
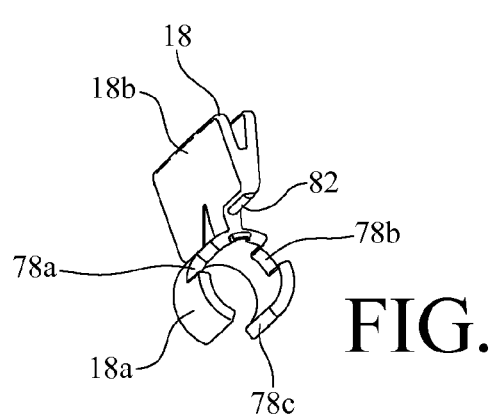
FIG. 15 is a perspective view of the adjustment knob of the exemplary fuel and oil mixing device of FIGS. 1 and 2.

Referring now to FIGS. 13-15, the oil metering valve 16 is a cylindrical component housed in the cavity 36 defined by the mixer body 14. The oil metering valve 16 defines three tongues 76a, 76b, 76c (FIGS. 13 and 14) that mate with three corresponding grooves 78a, 78b, 78c defined by the adjustment knob 18 (FIG. 15) to secure the adjustment knob 18 relative to oil metering valve 16, which in turn, secures the adjustment knob 18 relative to the mixer body 14.

The oil metering valve 16 defines a plurality of longitudinal slots 80a-80e for controlling oil flow from the oil reservoir 12 through the oil exit orifice 32 and to the ramp 42. The slots 80a-80e are of differing widths and are positioned on the exterior surface of the oil metering valve 16, each such slot 80a-80e representing a predetermined fuel-oil ratio. In this exemplary embodiment, there are five slots 80a-80e spaced approximately 33° apart from one another. These five slots 80a-80e represent common fuel-oil ratios for various commercially available two-cycle engines. Of course, additional slots, different radial spacing, or other slots may be used to achieve different fuel-to-oil ratios without departing from the spirit and scope of the present invention. Lastly, in this exemplary embodiment, a sixth valve position (not shown) may used for blocking oil flow when a user wants to pour only fuel from the fuel container 100.

Referring now to FIGS. 5, 13, and 15, the adjustment knob 18 works in conjunction with the oil metering valve 16 to allow a user to manipulate the oil metering valve 16 to select different fuel-oil ratios. Specifically, the adjustment knob 18 defines grooves 78a, 78b, 78c for mating with tongues 76a, 76b, 76c defined by the oil metering valve 16, as mentioned above. Therefore, the adjustment knob 18 and the oil metering valve 16 rotate together as the portion of the adjustment knob 18 accessible to a user from the exterior of the mixer body 14 is manipulated. By rotating the adjustment knob 18 in this manner, the oil metering valve 16 is rotated within the cavity 36 defined by the mixer body 14, and thus, one of the five slots 80a-80e defined by the oil metering valve 16 is effectively selected for controlling oil flow from the oil reservoir 12, through the oil exit orifice 32, and onto the ramp 42. In other words, when in registry with the oil exit orifice 32 and the ramp 42, the selected slot defines a pathway for the oil along the external surface of the oil metering valve 16 between the oil exit orifice 32 and the ramp 42.

Figure 16:
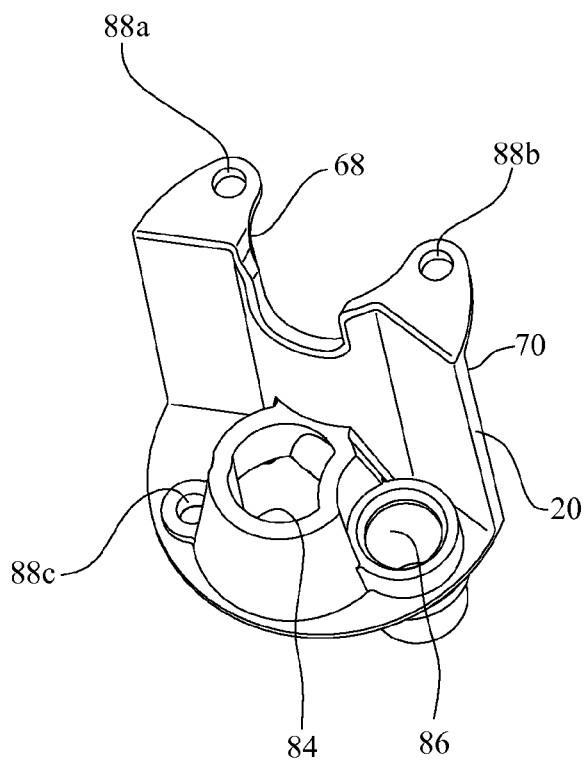
FIG. 16 is a perspective view of the inner housing of the exemplary fuel and oil mixing device of FIGS. 1 and 2.
Figure 17:
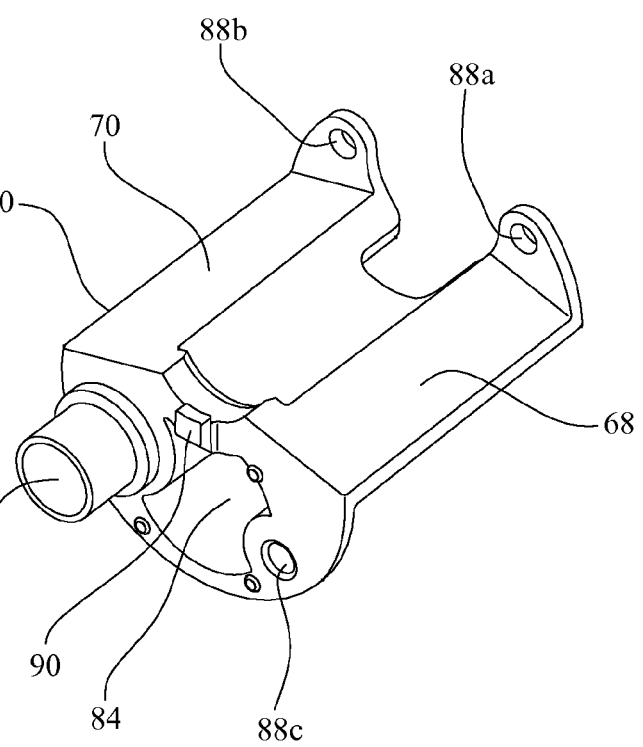
FIG. 17 is an alternate perspective view of the inner housing of the exemplary fuel and oil mixing device of FIGS. 1 and 2.

Referring now to FIGS. 16 and 17, the inner housing 20 is an internal component within the mixer body 14 that completes the assembly of the exemplary fuel and oil mixing device 10. The inner housing 20 includes an integral spout portion 84. The integral spout portion 84 facilitates mixing of the streams of fuel and oil, funneling the fuel-oil mixture into an outer mixing cavity 85 defined between the inner housing 20 and the exterior wall of the mixer body 14. From this outer mixing cavity 85, the fuel-oil mixture is dispensed through the spout 102.

Figure 7:
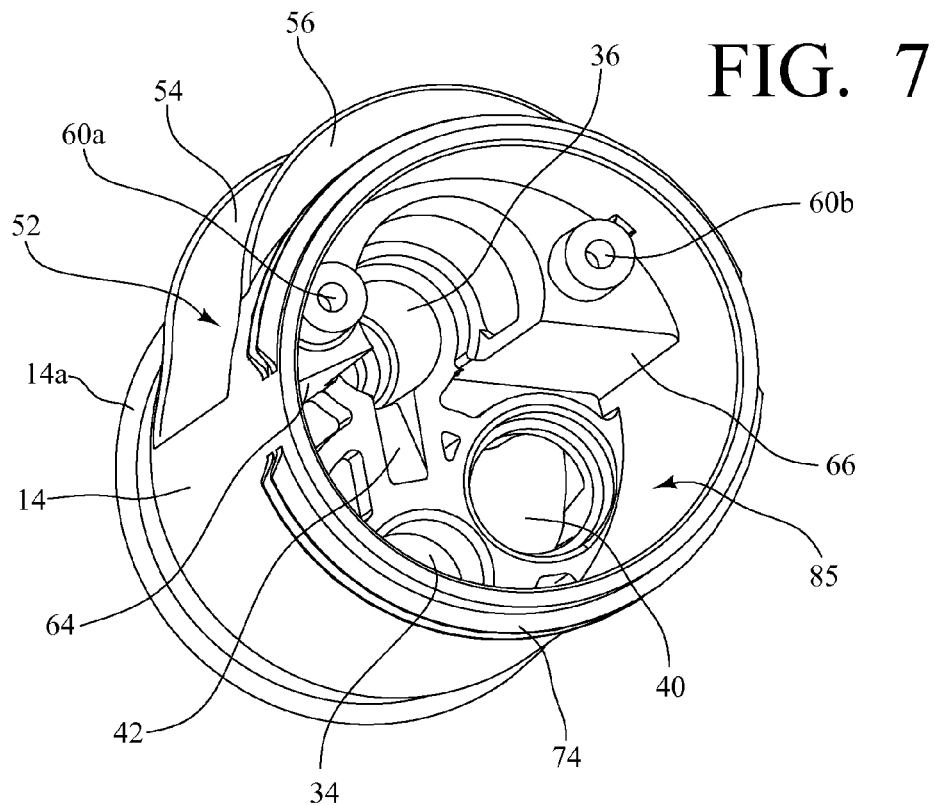
FIG. 7 is an alternate perspective view of the mixer body of FIG. 5.

Furthermore, and referring still to FIGS. 16 and 17, the inner housing 20 defines three orifices 88a, 88b, 88c. Referring back to FIGS. 7 and 8, the mixer body 14 defines two or more cylindrical bosses 60a, 60b. The orifices 88a, 88b, 88c are aligned with bosses 60a, 60b, as best shown in FIG. 7. (A third boss that aligns with the third orifice 88c is not viewable in the Figures.) Thus, self-tapping screws 62a, 62b or similar fasteners are then used to connect the mixer body 14 to the inner housing 20. As the components of the exemplary fuel and oil mixing device 10 are assembled in this manner, a projection 90 defined by the inner housing 20 is positioned adjacent to the ramp 42 of the mixer body and acts in conjunction with the ramp 42 to direct oil flow.

Figure 8:
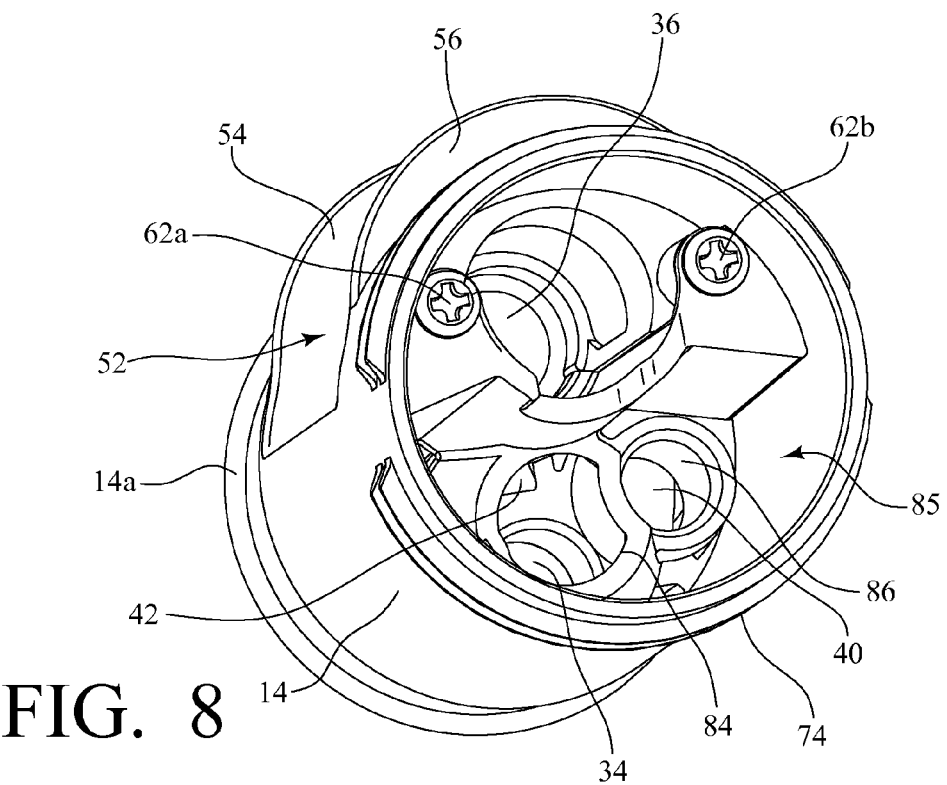
FIG. 8 is a perspective view similar to that of FIG. 7, but also showing the inner housing connected to the mixer body.
Figure 9:
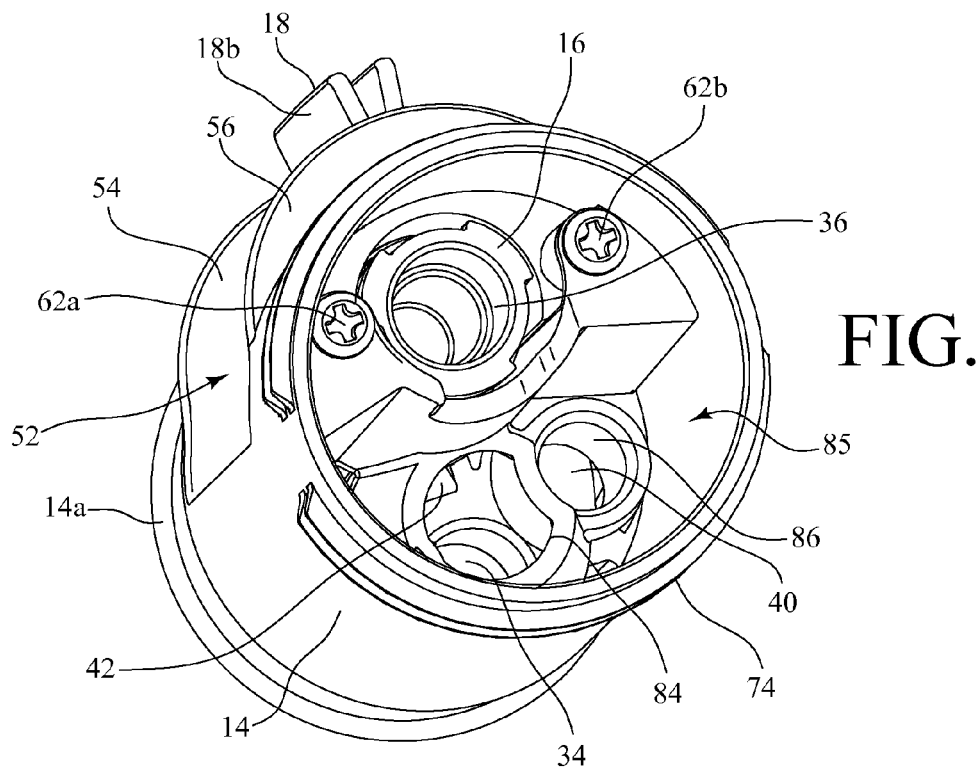
FIG. 9 is a perspective view similar to that of FIG. 8, but also showing the oil metering valve and the adjustment knob connected to the mixer body.

Referring now to the views of the mixer body 14 of FIGS. 7-8 and the views of the inner housing 20 of FIGS. 16-17, in his exemplary embodiment, the surfaces 64, 66 of the mixer body 14 are tapered to form a tight fit with adjacent surfaces 68, 70 of the inner housing 20 when the self-tapping screws 62a, 62b are tightened completely. Furthermore, prior to connecting the mixer body 14 to the inner housing 20, an adhesive may be applied to either of the tapered surfaces 64, 66 of the mixer body 14 and/or the adjacent surfaces 68, 70 on the inner housing 20 to help form an airtight compartment necessary for keeping volatile vapors inside the fuel container 100.

Finally, with respect to the inner housing 20, in this exemplary embodiment, the inner housing 20 also includes a shoulder defining a through hole 86 for positioning the dip stick 44. This through hole 86 is in registry with the orifice 40 defined by the mixer body 14, which allows for insertion of the dip stick 44 through the mixer body 14 and into the oil reservoir 12.

Figure 10:
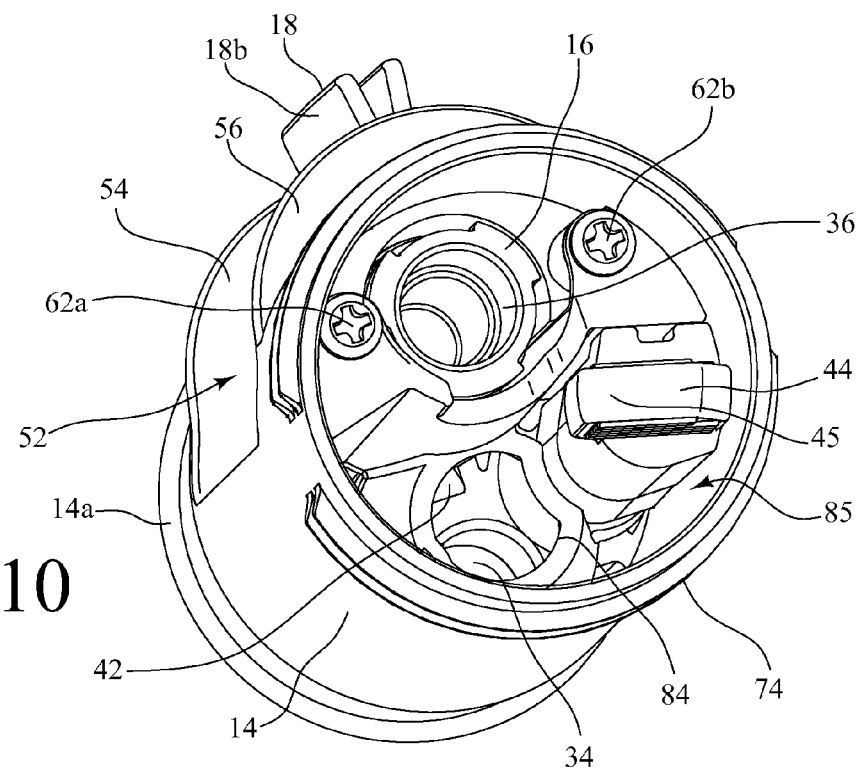
FIG. 10 is a perspective view similar to that of FIG. 9, but also showing the dip stick.
Figure 11:
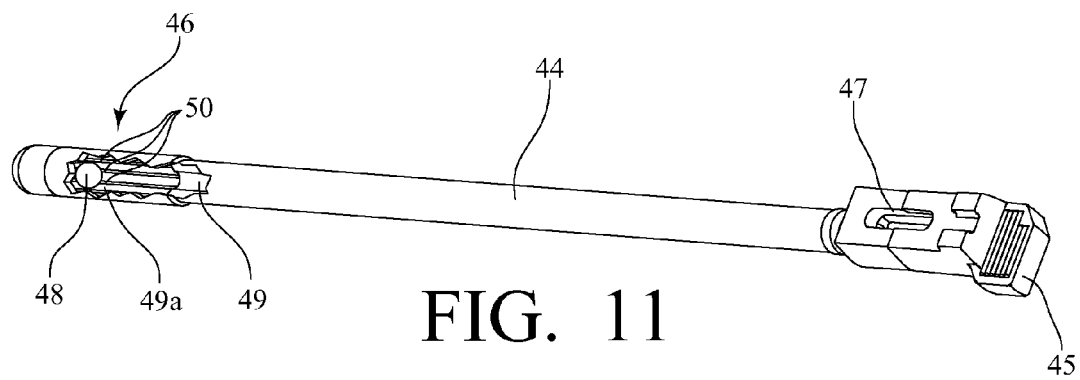
FIG. 11 is a perspective view of the dip stick of the exemplary fuel and oil mixing device of FIGS. 1 and 2.

Referring now to FIGS. 10-12, in this exemplary embodiment, the dip stick 44 is an elongated tubular structure that includes a handle 45 at a first distal end and a vent assembly 46 at the opposite distal end. The dip stick 44 may be provided with markings (not shown) along its exterior surface for providing a visual indication of the oil level in the oil reservoir 12 once the dip stick 44 is withdrawn, as with common dip sticks. Furthermore, in this exemplary embodiment, the dip stick 44 provides a pathway for air between the outer mixing cavity 85 defined by the mixer body 14 and the oil reservoir 12 for venting. Specifically, the dip stick 44 defines an internal channel 49 extending the length of the dip stick 44. At the first distal end, near the handle 45, the internal channel 49 terminates in an air vent orifice 47, which provides a pathway for air to flow from or into the outer mixing cavity 85 defined by the mixer body 14. At the opposite distal end of the dip stick 44, the internal channel 49 terminates in a vent assembly 46. In this regard, the vent assembly 46 is essentially an extension of the dip stick 44 and defines an enlarged diameter channel 49a in alignment with the internal channel 49. The vent assembly 46 further includes a ball 48 (preferably constructed of metal) that is received in the enlarged diameter channel 49a. In other words, the enlarged diameter channel 49a defines a path of travel for the ball 48. Finally, the vent assembly 46 defines a through hole 51 through its distal end, as best shown in FIG. 12. The ball 48 has sufficient weight such that it is initially seated at the bottom of the vent assembly 46 when the fuel container 100 is in a level position and not in use, thus blocking the through hole 51 and preventing oil in the oil reservoir 12 from entering the vent assembly 46. As the fuel container 100 and the fuel and oil mixing device 10 is manipulated for pouring, the ball 48 unseats from the bottom of the vent assembly 46 and moves away from the through hole 51, thus allowing air to flow from the outer mixing cavity 85 defined by the mixer body 14, through the air vent orifice 47 of the dip stick 44, through the internal channel 49 and the enlarged diameter channel 49a, and out the through hole 51 and into the oil reservoir 12. This prevents a vacuum in the oil reservoir 12. In this exemplary embodiment, the vent assembly 46 defines a plurality of grooves 50 along the walls of the enlarged diameter channel 49a to facilitate such air flow around the ball 48 when it is unseated.

Finally, and referring again to FIG. 2, the exemplary fuel and oil mixing device 10 includes a "pass through" venting system. Specifically, and as mentioned above, the generally U-shaped plastic tube 27 is connected to and in fluid communication with the internal venting orifice 24 of the oil reservoir 12. Once assembled, the internal venting orifice 24 is mated with the cavity 36 defined by the mixer body 14 and is in fluid communication with a "pass through" volume 72 defined by the oil metering valve 16 along its central longitudinal axis. In other words, the oil metering valve 16 defines a longitudinal channel, in this exemplary embodiment, having an internal diameter of approximately 0.19" where it mates with the internal venting orifice 24 of the oil reservoir 12, and flaring out to an internal diameter of approximately 0.37" where it is in fluid communication with the internal vent 102a of the spout 102. Accordingly, a pathway is defined from the interior of the fuel container 100, through the plastic tube 27, through the internal venting orifice 24 of the oil reservoir 12, through the "pass through" volume 72 defined by the oil metering valve 16, and through the internal vent 102a of the spout 102 to a tank into which the fuel and oil mixture is flowing.

To use the exemplary fuel and oil mixing device 10, a user places a quantity of fuel in the fuel container 100, places a quantity of oil in the oil reservoir 12, and connects the fuel and oil mixing device 10 to the fuel container 100. The user then manipulates the adjustment knob 18 to the desired fuel-oil ratio, such that one of the slots 80a-80e defined by the oil metering valve 16 is effectively selected for controlling oil flow from the oil reservoir 12. To assist the user in selecting the proper setting, each position of the adjustment knob 18 preferably includes a marking (not shown) that corresponds to its particular fuel-oil ratio. The adjustment knob 18 may also be manipulated such that the oil metering valve 16 blocks the oil from mixing with the fuel, such that only fuel is introduced, allowing the fuel container 100 fitted with the fuel and oil mixing device 10 to be used as a fuel-only dispenser.

Then, as the fuel container 100 fitted with the fuel and oil mixing device 10 is tipped forward, oil flows from the oil reservoir 12, out of the oil exit orifice 32, along one of the slots 80a-80e selected by the user, and exits on the ramp 42. At the same time, fuel flows from the fuel container 100, passes through the fuel metering orifice 22, passes through the orifice 34 defined by the mixer body 14, and then mixes with the oil exiting the ramp 42. The integral spout portion 84 defined by the inner housing 20 facilitates mixing of the streams of fuel and oil, funneling the fuel-oil mixture into an outer mixing cavity 85 defined between the inner housing 20 and the exterior wall of the mixer body 14. From this outer mixing cavity 85, the fuel-oil mixture is dispensed through the spout 102.

Thus, the fuel and oil mixing device 10 of the present invention allows a common fuel container 100 to be fitted with the device 10 to allow a user to select the ratio of fuel to oil in the mixture that exits the device 10, thereby allowing a single device to be used to fill multiple two-stroke engines.

One of ordinary skill in the art will recognize that additional embodiments are also possible without departing from the teachings of the present invention. This detailed description, and particularly the specific details of the exemplary embodiment disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A fuel and oil mixing device adapted to be secured to and used with a fuel container storing a quantity of a fuel and having an opening for dispensing the fuel, comprising:

an oil reservoir for storing a quantity of an oil and defining an oil orifice for the oil to exit said oil reservoir, said oil reservoir adapted to be fit to the opening of the fuel container and defining a fuel orifice for the fuel to pass from the fuel container through said oil reservoir for dispensing;

a mixer body secured to and in fluid communication with said oil reservoir for receiving the oil from said oil reservoir and the fuel passing through said oil reservoir;

an oil metering valve housed in a cavity defined by said mixer body for controlling flow of the oil from said oil reservoir through said mixer body, said oil metering valve defining a plurality of longitudinal slots on an exterior surface thereof, each such slot controlling flow of the oil from said oil reservoir through said mixer body, and each such slot representing a predetermined fuel-oil ratio; and an adjustment knob operably connected to said oil metering valve, such that manipulation of the adjustment knob allows for a selection of a desired fuel-oil ratio, such that a mixture with the desired fuel-oil ratio can be dispensed from the device.

2. The fuel and oil mixing device as recited in claim 1, wherein the adjustment knob is secured to and rotates with said oil metering valve, such that manipulation of the adjustment knob effectively selects one of the plurality of longitudinal slots for controlling flow of the oil from said oil reservoir through said mixer body, such that the mixture with the desired fuel-oil ratio can be dispensed from the device.

3. The fuel and oil mixing device as recited in claim 2, wherein said oil metering valve may be rotated to a position for blocking flow of the oil for pouring only the fuel from the fuel container.

4. The fuel and oil mixing device as recited in claim 2, wherein said oil metering valve defines a plurality of tongues that mate with a plurality of corresponding grooves defined by the adjustment knob, thus securing the adjustment knob to said oil metering valve.

5. The fuel and oil mixing device as recited in claim 2, wherein said mixer body also defines an opening through an exterior surface which allows the adjustment knob to be secured to said oil metering valve, with a portion of the adjustment knob extending away from said mixer body so that it is accessible to a user.

6. The fuel and oil mixing device as recited in claim 5, wherein the adjustment knob includes a first portion adapted to be secured to the oil metering valve and a second portion that is adapted to be grasped and manipulated by the user, the second portion that is adapted to be grasped and manipulated being positioned in a cavity on the exterior surface of said mixer body.

7. The fuel and oil mixing device as recited in claim 6, wherein said mixer body includes integral grooves that engage the second portion of the adjustment knob that is adapted to be grasped and manipulated by the user to positively locate and fix a position of the adjustment knob relative to said mixer body.

8. The fuel and oil mixing device as recited in claim 1, wherein said mixer body includes a baffle that acts as a dam for the oil from said oil reservoir, with said mixer body further defining an oil exit orifice near a center of said baffle for directing the oil into a selected one of the plurality of longitudinal slots defined by said oil metering valve.

9. The fuel and oil mixing device as recited in claim 2, wherein said mixer body includes a baffle that acts as a dam for the oil from said oil reservoir, with said mixer body further defining an oil exit orifice near a center of said baffle for directing the oil into a selected one of the plurality of longitudinal slots defined by said oil metering valve.

10. The fuel and oil mixing device as recited in claim 8, wherein said mixer body defines a ramp beyond said oil exit orifice, such that after the oil passes through said oil exit orifice and along a pathway defined by a selected one of the plurality of longitudinal slots defined said oil metering valve, the oil exits onto the ramp and is introduced into the fuel flowing from the fuel container, through said oil reservoir, and into said mixer body.

11. The fuel and oil mixing device as recited in claim 1, and further comprising an inner housing within and connected to said mixer body, said inner housing including an integral spout portion to facilitate mixing of the fuel and the oil prior to dispensing the mixture.

12. The fuel and oil mixing device as recited in claim 11, and further comprising a dip stick, wherein said inner housing further defines a through hole in registry with an orifice defined by said mixer body, thus allowing for insertion of the dip stick through said mixer body and said inner housing, and into said oil reservoir.

13. The fuel and oil mixing device as recited in claim 12, wherein the dip stick provides a pathway for air between an outer mixing cavity defined by said mixer body and said oil reservoir for venting.

14. The fuel and oil mixing device as recited in claim 1, wherein said oil reservoir is generally cylindrical and is inserted into the fuel container.

15. The fuel and oil mixing device as recited in claim 14, wherein said oil reservoir has a circumferential flange for engaging the opening of the fuel container.

16. The fuel and oil mixing device as recited in claim 1, wherein said mixer body further includes a mixer body collar having internal threads for mating with threads on the fuel container for securing the device to the fuel container.

17. The fuel and oil mixing device as recited in claim 1, wherein said mixer body further includes threads at a distal end of the said mixer body for securing a spout to said mixer body using a spout collar.

18. The fuel and oil mixing device as recited in claim 17, and further comprising a venting system, including a tube connected to and in fluid communication with an internal venting orifice defined by said oil reservoir, said internal venting orifice mating with the cavity defined by said mixer body for said oil metering valve, such that said tube is in fluid communication with a volume defined by said oil metering valve, which volume is then in fluid communication with an internal vent defined by the spout that is secured to said mixer body.

* * * * *